United States Patent
Mohlin et al.

(10) Patent No.: US 12,194,832 B2
(45) Date of Patent: Jan. 14, 2025

(54) MULTIPLE CIRCUIT THERMAL MANAGEMENT SYSTEM COMPRISING MIXING LINES, AND VEHICLE

(71) Applicant: Scania CV AB, Södertälje (SE)

(72) Inventors: Martin Mohlin, Stockholm (SE); Ola Hall, Stockholm (SE); Zoltan Kardos, Södertälje (SE); Rickard Eriksson, Rönninge (SE)

(73) Assignee: Scania CV AB, Södertälje (SE)

( * ) Notice: Subject to any disclaimer, the term of this patent is extended or adjusted under 35 U.S.C. 154(b) by 100 days.

(21) Appl. No.: 18/008,341

(22) PCT Filed: Jun. 24, 2021

(86) PCT No.: PCT/SE2021/050629
§ 371 (c)(1),
(2) Date: Dec. 5, 2022

(87) PCT Pub. No.: WO2022/005373
PCT Pub. Date: Jan. 6, 2022

(65) Prior Publication Data
US 2023/0278415 A1    Sep. 7, 2023

(30) Foreign Application Priority Data
Jul. 1, 2020 (SE) .................. 2050811-5

(51) Int. Cl.
*B60K 11/02* (2006.01)
*B60H 1/00* (2006.01)
(Continued)

(52) U.S. Cl.
CPC .......... *B60K 11/02* (2013.01); *B60H 1/00571* (2013.01); *B60H 1/00885* (2013.01);
(Continued)

(58) Field of Classification Search
CPC ............... B60K 11/02; B60H 1/00571; B60H 1/00885; F01P 5/10; F01P 7/14;
(Continued)

(56) References Cited

U.S. PATENT DOCUMENTS

2003/0029167 A1    2/2003 Hudson et al.
2009/0020079 A1    1/2009 Muller et al.
(Continued)

FOREIGN PATENT DOCUMENTS

CN    106314110 A    1/2017
DE    102015205492 A1 * 12/2015 ............. F01P 11/20
(Continued)

OTHER PUBLICATIONS

Scania CV AB, International Patent Application No. PCT/SE2021/050629, International Search Report, Aug. 30, 2021.
(Continued)

*Primary Examiner* — Syed O Hasan
(74) *Attorney, Agent, or Firm* — Moore & Van Allen PLLC; W. Kevin Ransom (57) ABSTRACT

A thermal management system is disclosed configured to regulate the temperature of a number of vehicle components. The system comprises one expansion tank and two or more coolant circuits each configured to regulate the temperature of a vehicle component of the number of vehicle components. Each coolant circuit of the two or more coolant circuits comprises a heat exchanger configured to regulate the temperature of coolant in the coolant circuit, a coolant pump comprising a pump inlet, and a static line fluidly connecting the pump inlet to the expansion tank. The present disclosure further relates to a vehicle comprising a thermal management system.

20 Claims, 2 Drawing Sheets

(51) Int. Cl.
*F01P 5/10* (2006.01)
*F01P 7/14* (2006.01)
*F01P 11/02* (2006.01)
*F01P 11/04* (2006.01)

(52) U.S. Cl.
CPC ............... *F01P 5/10* (2013.01); *F01P 7/14* (2013.01); *F01P 11/029* (2013.01); *F01P 11/04* (2013.01); *F01P 2007/146* (2013.01); *F01P 2050/24* (2013.01); *F01P 2060/08* (2013.01); *F01P 2060/14* (2013.01)

(58) Field of Classification Search
CPC .... F01P 11/029; F01P 11/04; F01P 2007/146; F01P 2050/24; F01P 2060/08; F01P 2060/14; F28D 9/0006; F28D 15/06; F28D 9/0093
See application file for complete search history.

(56) References Cited

U.S. PATENT DOCUMENTS

| | | | |
|---|---|---|---|
| 2012/0241129 A1 | 9/2012 | Kohl et al. | |
| 2015/0308326 A1* | 10/2015 | Davies | F01P 11/029 137/2 |
| 2016/0201549 A1 | 7/2016 | Kim | |
| 2017/0167355 A1 | 6/2017 | Kim et al. | |
| 2018/0163607 A1 | 6/2018 | Uto et al. | |
| 2019/0078497 A1* | 3/2019 | Enomoto | F01P 11/029 |
| 2019/0299738 A1 | 10/2019 | Conti | |
| 2020/0149436 A1 | 5/2020 | Kardos et al. | |
| 2020/0300550 A1* | 9/2020 | Hall | F28D 15/06 |

FOREIGN PATENT DOCUMENTS

| | | | |
|---|---|---|---|
| DE | 102017223128 B3 | 1/2019 | |
| EP | 0999078 A1 | 5/2000 | |
| EP | 2392486 A2 | 12/2011 | |
| WO | WO-03042516 A2 * | 5/2003 | ............ F01P 11/029 |
| WO | 2015080659 A1 | 6/2015 | |
| WO | 2016208550 A1 | 12/2016 | |
| WO | 2019203701 A1 | 10/2019 | |

OTHER PUBLICATIONS

Scania CV AB, International Patent Application No. PCT/SE2021/050629, Written Opinion, Aug. 30, 2021.
Scania CV AB, Swedish Patent Application No. 2050811-5, Office Action, Mar. 1, 2021.
Scania CV AB, Swedish Patent Application No. 2050811-5, Office Action, Aug. 31, 2021.
Scania CV AB, International Patent Application No. PCT/SE2021/050629, International Preliminary Report on Patentability, Dec. 13, 2022.
Scania CV AB, European Patent Application No. 21832211.3, Extended European Search Report, Jul. 5, 2024.

* cited by examiner

MULTIPLE CIRCUIT THERMAL MANAGEMENT SYSTEM COMPRISING MIXING LINES, AND VEHICLE

CROSS-REFERENCE TO RELATED APPLICATIONS

This application is a National Stage Patent Application (filed under 35 § U.S.C. 371) of PCT/SE2021/050629, filed Jun. 24, 2021, of the same title, which, in turn claims priority to Swedish Patent Application No. 2050811-5 filed Jul. 1, 2020, of the same title; the contents of each of which are hereby incorporated by reference.

FIELD OF THE INVENTION

The present disclosure relates to a thermal management system configured to regulate the temperature of a number of vehicle components. The present disclosure further relates to a vehicle comprising a thermal management system.

BACKGROUND OF THE INVENTION

Traditionally, a combustion engine has been used to provide motive power to a vehicle. A combustion engine produces a lot of excess heat which is cooled by a cooling system. Such a coolant system usually comprises coolant channels, a coolant pump and a radiator configured to transfer heat from the cooling system to ambient air.

With the introduction of components and systems such as electric propulsion systems, hybrid electric propulsion systems, waste heat recovery systems, batteries, retarders, and the like, modern vehicles usually comprise numerous components and systems which require a regulation of the temperature. Many of these components and systems have different temperature requirements, and some components, such as batteries are especially sensitive to temperature deviations. Therefore, modern vehicles usually comprise several cooling systems each configured to regulate the temperature of a vehicle system or a vehicle component. All these cooling systems are usually designed in size and capacity to provide sufficient cooling at the highest power output of the respective system/component. Therefore, in most operating conditions, the size and capacity of the respective cooling system is greater than what is needed given the current power output of the vehicle system or component. Moreover, each component of a cooling system adds cost, complexity, and weight to a vehicle.

Furthermore, generally, on today's consumer market, it is an advantage if products comprise different features and functions while the products have conditions and/or characteristics suitable for being manufactured and assembled in a cost-efficient manner.

SUMMARY OF THE INVENTION

It is an object of the present invention to overcome, or at least alleviate, at least some of the above-mentioned problems and drawbacks.

According to a first aspect of the invention, the object is achieved by a thermal management system configured to regulate the temperature of a number of vehicle components. The system comprises one expansion tank, and a multiple of coolant circuits each configured to regulate the temperature of a vehicle component of the number of vehicle components. Each coolant circuit of the multiple of coolant circuits comprises a heat exchanger configured to regulate the temperature of coolant in the coolant circuit, a coolant pump comprising a pump inlet, and a static line fluidly connecting the pump inlet to the expansion tank.

Since each coolant circuit of the multiple of coolant circuits comprises the above specified features including the static line fluidly connecting the respective pump inlet to the expansion tank, a system is provided capable of regulating the temperature of a number of vehicle components in an independent and individual manner, while having conditions for reducing cost, complexity, and weight of a vehicle comprising the system. Moreover, a system is provided having conditions for utilizing available space in a vehicle in an efficient manner. This is because only one expansion tank is needed for regulating the pressure of the multiple of coolant circuits. Furthermore, since each static line fluidly connects each pump inlet to the expansion tank, the pressure of each cooling circuit is regulated in an efficient manner and the multiple of coolant circuits can be deaerated via the expansion tank. Moreover, service and repair of the thermal management system may be facilitated. In addition, filling of coolant into the multiple of coolant circuits can be facilitated.

Moreover, a modularized system is provided in which coolant circuits can be added and removed from the system for different configurations of vehicles without significantly adding cost, complexity, and weight to the vehicle comprising the system.

Accordingly, a system is provided overcoming, or at least alleviating, at least some of the above-mentioned problems and drawbacks. As a result, the above-mentioned object is achieved.

Optionally, the system comprises a common static line portion connected to the expansion tank, and wherein the static line of each coolant circuit fluidly connects the respective pump inlet to the expansion tank via the common static line portion. Thereby, a further simplified system is provided in which coolant circuits can be added to the system simply by connecting a static line of the added coolant circuit to the common static line portion.

Optionally, the multiple of coolant circuits comprises three or more coolant circuits. Thereby, a system is provided capable of regulating the temperature of at least three vehicle components in an independent and individual manner, while having conditions for reducing cost, complexity, and weight of a vehicle comprising the system.

Optionally, at least two coolant circuits of the multiple of coolant circuits are configured to operate at different temperature levels. Thereby, a system is provided capable of regulating the temperature of a number of vehicle components at different temperature levels in an independent and individual manner, while having conditions for reducing cost, complexity, and weight of a vehicle comprising the system.

Optionally, the thermal management system comprises a heat transferring system configured to transfer heat between at least two coolant circuits of the multiple of coolant circuits. Thereby, a system is provided having conditions for an increased cooling/heating capacity of one or more coolant circuits of the system. As a further result thereof, one or more of the coolant circuits of the system can be designed smaller in size and capacity than would be the case otherwise. As a still further result thereof, a system is provided having conditions for further reducing cost, complexity, and weight of a vehicle comprising the system.

Optionally, the heat transferring system comprises one or more mixing lines for transferring coolant between at least two coolant circuits of the multiple of coolant circuits. Thereby, a system is provided having conditions for transferring heat between at least two coolant circuits of the multiple of coolant circuits in a simple and efficient manner.

Optionally, the heat transferring system comprises a valve arrangement configured to control flow of coolant through the one or more mixing lines. Thereby, a system is provided having conditions for controlling transfer of heat between at least two coolant circuits of the multiple of coolant circuits in a simple and efficient manner.

Optionally, at least one of the one or more mixing lines is connected to the expansion tank. Thereby, a system is provided capable of utilizing the expansion tank as a mixing chamber for coolant. In this manner, a system is provided having conditions for transferring heat between at least two coolant circuits of the multiple of coolant circuits in a simple and efficient manner, while having conditions for reducing cost, complexity, and weight of a vehicle comprising the system.

Optionally, at least one of the one or more mixing lines is connected to the common static line portion. Thereby, a system is provided capable of utilizing the common static line portion as a mixing duct for coolant. In this manner, a system is provided having conditions for transferring heat between at least two coolant circuits of the multiple of coolant circuits in a simple and efficient manner, while having conditions for reducing cost, complexity, and weight of a vehicle comprising the system.

Optionally, the heat transferring system comprises a set of mixing lines comprising at least the same number of mixing lines as the number of coolant circuits of the thermal management system. Thereby, a system is provided having high capacity for transferring heat between at least two coolant circuits of the multiple of coolant circuits in a simple and efficient manner.

Optionally, each coolant circuit of the multiple of coolant circuits comprises a mixing line configured to transfer coolant from the coolant circuit to another coolant circuit of the multiple of coolant circuits. Thereby, a system is provided having high capacity for transferring heat between at least two coolant circuits of the multiple of coolant circuits in a simple and efficient manner.

Optionally, at least one of the one or more mixing lines fluidly connects a pump outlet of a coolant pump of one coolant circuit to a pump inlet of a coolant pump of another coolant circuit of the multiple of coolant circuits. Thereby, a system is provided having high capacity for transferring heat between at least two coolant circuits of the multiple of coolant circuits in a direct and efficient manner, while avoiding flow disturbances in the system.

Optionally, the heat transferring system comprises a heat pump circuit comprising a condenser arranged in one coolant circuit and an evaporator arranged in another coolant circuit of the multiple of coolant circuits. Thereby, a system is provided having conditions for transferring heat from a coolant circuit normally operating at a lower temperature to a coolant circuit normally operating at a higher temperature. In this manner, heat can be distributed and transferred between coolant circuits in an improved manner. As a further result thereof, a system is provided capable of improving the thermal efficiency of a vehicle comprising the system.

Optionally, one of the multiple of coolant circuits is an occupant compartment heating circuit configured to heat an occupant compartment of a vehicle comprising the thermal management system. Thereby, a system is provided capable of heating an occupant compartment of a vehicle, while having conditions for reducing cost, complexity, and weight of a vehicle comprising the system.

Optionally, the condenser is arranged in the occupant compartment heating circuit. Thereby, a system is provided capable of heating an occupant compartment of a vehicle in an energy efficient manner, while having conditions for reducing cost, complexity, and weight of a vehicle comprising the system.

Optionally, at least one of the multiple of coolant circuits is configured to regulate the temperature of a component of an electric propulsion system. Thereby, a system is provided capable of regulating the temperature of a component of an electric propulsion system, while having conditions for reducing cost, complexity, and weight of a vehicle comprising the system.

According to a second aspect of the invention, the object is achieved by a vehicle comprising a thermal management system according to some embodiments of the present disclosure.

Since the vehicle comprises a system according to some embodiments, a vehicle is provided capable of regulating the temperature of a number of vehicle components in an independent and individual manner, while having conditions for reducing cost, complexity, and weight of the vehicle.

Moreover, a vehicle is provided comprising a modularized system in which coolant circuits can be added and removed from the system for different configurations of powertrains without significantly adding cost, complexity, and weight to the vehicle.

Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various Aspects of the Invention, Including its Particular Features and Advantages, Will be Readily Understood from the Example Embodiments Discussed in the Following Detailed Description and the Accompanying Drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
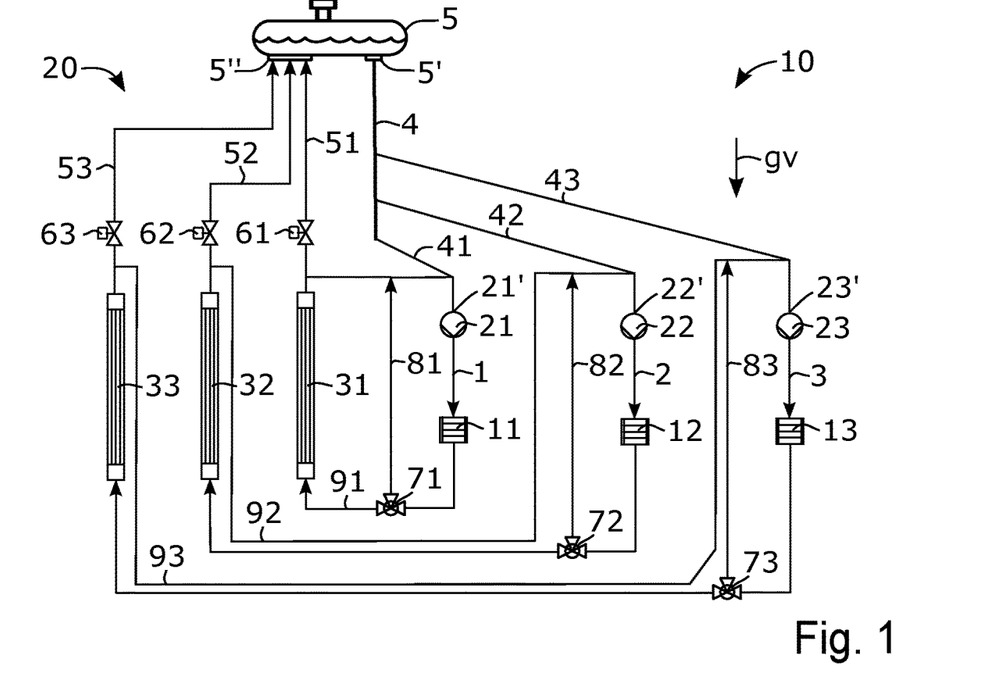
FIG. 1 illustrates a thermal management system, according to some embodiments.

FIG. 1 illustrates a thermal management system 10, according to some embodiments. The thermal management system 10 is configured to regulate the temperature of a number of vehicle components 11, 12, 13, as is further explained herein. The thermal management system 10 is in some places herein referred to as the "system 10" for reasons of brevity and clarity. The system 10 comprises one expansion tank 5 only and a multiple of coolant circuits 1, 2, 3.

According to the embodiments illustrated in FIG. 1, the system 10 comprises three coolant circuits 1, 2, 3. According to further embodiments, the system 10 may comprise another number of coolant circuits 1, 2, 3 such as two, four, five, six, seven, or the like, as is further explained herein. Each of the multiple of coolant circuits 1, 2, 3 is configured to regulate the temperature of a vehicle component 11, 12, 13 of the number of vehicle components 11, 12, 13. Purely as an example, one or more of the components 11, 12, 13 may be a component of an internal combustion engine, an electric propulsion system, an electric propulsion motor, power electronics, a propulsion battery, a fuel cell, a retarder, a condenser of a heat pump circuit, an occupant compartment heat exchanger, or the like.

Each coolant circuit 1, 2, 3 of the multiple of coolant circuits 1, 2, 3 comprises a heat exchanger 31, 32, 33 configured to regulate the temperature of coolant in the coolant circuit 1, 2, 3. The respective heat exchanger 31, 32, 33 may be a radiator, which may be arranged at a front area of a vehicle comprising the system 10 so as to be subjected to an airflow during driving of the vehicle. Moreover, each coolant circuit 1, 2, 3 of the multiple of coolant circuits 1, 2, 3 comprises a coolant pump 21, 22, 23 comprising a pump inlet 21', 22', 23'. Each coolant pump 21, 22, 23 is configured to circulate coolant through the respective coolant circuit 1, 2, 3. Moreover, according to the illustrated embodiments, each coolant circuit 1, 2, 3 comprises a bypass line 81, 82, 83 and a valve 71, 72, 73. The bypass line 81, 82, 83 of a coolant circuit 1, 2, 3 bypasses the heat exchanger 31, 32, 33 of the coolant circuit 1, 2, 3. The respective valve 71, 72, 73 is configured to direct coolant to the bypass line 81, 82, 83 and/or to a conduit portion 91, 92, 93 connected to the heat exchanger 31, 32, 33 of the coolant circuit 1, 2, 3. Thereby, the temperature of coolant in the coolant circuits 1, 2, 3 can be regulated by regulating the valves 71, 72, 73. The valves 71, 72, 73 may be thermostatic valves configured to open and close to the bypass line 81, 82, 83 and/or to a conduit portion 91, 92, 93 based on the temperature of coolant pumped to the valve 71, 72, 73. As an alternative, or in addition, valves 71, 72, 73 may be electronically controlled valves 71, 72, 73 controlled by a control arrangement.

According to further embodiments of the herein described, the one or more of the coolant circuits 1, 2, 3 of the multiple of coolant circuits 1, 2, 3 may lack a bypass line 81, 82, 83 bypassing the heat exchanger 31, 32, 33 of the coolant circuit 1, 2, 3 and consequently also a valve 71, 72, 73 configured to direct coolant to the bypass line 81, 82, 83 and/or to a conduit portion 91, 92, 93 connected to the heat exchanger 31, 32, 33 of the coolant circuit 1, 2, 3. According to such embodiments, the temperature of coolant in the coolant circuit 1, 2, 3, and/or the cooling power of the vehicle component 11, 12, 13, may be regulated by controlling operation of the coolant pump 21, 22, 23 of the coolant circuit 1, 2, 3 and/or by controlling operation of a fan configured to generate an airflow through the heat exchanger 31, 32, 33 of the coolant circuit 1, 2, 3. According to embodiments herein, each coolant circuit 1, 2, 3 of the multiple of coolant circuits 1, 2, 3 comprises a static line 41, 42, 43 fluidly connecting the pump inlet 21', 22', 23' of the coolant pump 21, 22, 23 to the expansion tank 5.

Due to these features, the respective cooling circuit 1, 2, 3 of the multiple of coolant circuits 1, 2, 3 can be operated in an independent and individual manner so as to regulate the temperature of a vehicle component 11, 12, 13. That is, a cooling circuit 1, 2, 3 of the multiple of coolant circuits 1, 2, 3 can be operated at a different temperature level and at a different coolant flow rate level than the other coolant circuits 1, 2, 3 of the system 10. Furthermore, since the system 10 comprises one common expansion tank 5 fluidly connected to each coolant circuit 1, 2, 3 of the system 10, a less complex and costly system 10 is provided. In addition, a system 10 is provided having conditions for utilizing available space in a vehicle in an efficient manner.

Moreover, a modularized system 10 is provided in which coolant circuits 1, 2, 3 can be added and removed from the system 10 for different configurations of vehicles without significantly adding cost, complexity, and weight to a vehicle comprising the system 10.

According to the illustrated embodiments, the expansion tank 5 is mounted at a higher point than the other components of the system 1 relative to a local gravity vector gv when the system 10 is mounted to a vehicle and the vehicle is positioned in an upright use position. Each static line 41, 42, 43 fluidly connects the expansion tank 5 to a coolant circuit 1, 2, 3. Moreover, each static line 41, 42, 43 may be formed by a duct or conduit. In this manner, when the system 10 is filled with coolant, the static lines 41, 42, 43 will provide a static pressure to a respective coolant circuit 1, 2, 3 of the system 10. A static line 41, 42, 43 is separated from a coolant circuit 1, 2, 3 in the sense that no coolant is pumped through the static line 41, 42, 43, during normal operation of the coolant circuit 1, 2, 3, upon operation of the coolant pump 21, 22, 23 of the coolant circuit 1, 2, 3. Accordingly, substantially no flow of fluid, or at least only a low flow rate of fluid, may be provided through the respective static line 41, 42, 43 during normal operation of the system 10.

As can be seen in FIG. 1, each static line 41, 42, 43 of the system 10 is routed so as to facilitate the transport of air bubbles from the respective coolant circuit 1, 2, 3 to the expansion tank 5 by gravity. In more detail, according to the illustrated embodiments, each static line 41, 42, 43 of the system 10 is routed such that that an extension direction of the static line 41, 42, 43 has a vector component parallel to a local gravity vector gv along the full length of the static line 41, 42, 43 when the system 10 is mounted in an intended mounting position on a vehicle and the vehicle is positioned in an upright use position. Moreover, according to some embodiments, one or more of the static lines 41, 42, 43 of the system 10 may be routed such that that a portion of the static line 41, 42, 43 has an extension direction parallel to a horizontal plane at the location of the system 10. According to such embodiments, such a static line 41, 42, 43 may be routed such that a vector component of the extension direction parallel to a local gravity vector gv does not change sign along the full length of the static line 41, 42, 43 when the system 10 is mounted in an intended mounting position on a vehicle and the vehicle is positioned in an upright use position. In this manner, air bubbles entering a static line 41, 42, 43 can be transported along the full length of the static line 41, 42, 43 in an efficient manner due to gravity and the density difference between the air bubbles and the coolant. Moreover, due to these features, filling of coolant into the system 10 may be facilitated, for example during assembly, service, and repair of the system 10. In addition, since each coolant circuit 1, 2, 3 of the multiple of coolant circuits 1, 2, 3 comprises a static line 41, 42, 43 fluidly connecting the pump inlet 21', 22', 23' to the expansion tank 5, the respective pump inlet 21', 22', 23' can be deaired in an efficient manner. Furthermore, cavitation in the respective coolant pump 21, 22, 23 can be avoided due to the fluid connection between the respective pump inlet 21', 22', 23' and the expansion tank 5.

According to the illustrated embodiments, the system 10 comprises a common static line portion 4 connected to the expansion tank 5. The static line 41, 42, 43 of each coolant circuit 1, 2, 3 fluidly connects the respective pump inlet 21', 22', 23' to the expansion tank 5 via the common static line portion 4. Thereby, a further simplified system 10 is provided in which coolant circuits 1, 2, 3 can be added to the system 10 simply by connecting a static line 41, 42, 43 of the added coolant circuit 1, 2, 3 to the common static line portion 4. The common static line portion 4 may have a greater cross sectional area than the individual static lines 41, 42, 43. According to further embodiments, the static lines 41, 42, 43 of the system 10 may be directly connected to the expansion tank 5.

According to the illustrated embodiments, each of the coolant circuits 1, 2, 3 of the multiple of coolant circuits 1, 2, 3 are configured to operate at different temperature levels. According to further embodiments, at least two coolant circuits 1, 2, 3 of the multiple of coolant circuits 1, 2, 3 may be configured to operate at different temperature levels.

According to the illustrated embodiments, the thermal management system 10 comprises a heat transferring system 20 configured to transfer heat between at least two coolant circuits 1, 2, 3 of the multiple of coolant circuits 1, 2, 3. In more detail, according to the illustrated embodiments, each coolant circuit 1, 2, 3 of the multiple of coolant circuits 1, 2, 3 comprises a mixing line 51, 52, 53 configured to transfer coolant from the coolant circuit 1, 2, 3 to another coolant circuit 1, 2, 3 of the multiple of coolant circuits 1, 2, 3. The heat transferring system 20 may thus comprise a set of mixing lines 51, 52, 53 comprising the same number of mixing lines 51, 52, 53 as the number of coolant circuits 1, 2, 3 of the thermal management system 10. Moreover, according to the illustrated embodiments, each mixing line 51, 52, 53 is connected to the expansion tank 5. In more detail, each mixing line 51, 52, 53 fluidly connects a portion of the respective coolant circuit 1, 2, 3 downstream of the heat exchanger 31, 32, 33 of the coolant circuit 1, 2, 3 to the expansion tank 5. Moreover, each mixing line 51, 52, 53 is connected to a second connection 5" of the expansion tank 5, whereas the common static line portion 4 is connected to a first connection 5' of the expansion tank 5. According to further embodiments, the system 10 may comprise a common mixing line portion connected to the second connection 5" of the expansion tank 5, wherein the mixing lines 51, 52, 53 are connected to the common mixing line portion. According to further embodiments of the herein described, the system 10 may comprise one or more mixing lines 51, 52, 53 for transferring coolant between at least two coolant circuits 1, 2, 3 of the multiple of coolant circuits 1, 2, 3. Moreover, a least one of such one or more mixing lines 51, 52, 53 may be connected to the expansion tank 5.

Thus, the heat transferring system 20, as referred to herein, may comprise one or more mixing lines 51, 52, 53 for transferring coolant between at least two coolant circuits 1, 2, 3 of the multiple of coolant circuits 1, 2, 3 so as to transfer heat between the at least two coolant circuits 1, 2, 3. According to further embodiments, the heat transferring system 20 may have another layout and/or design and may be configured to transfer heat between at least two coolant circuits 1, 2, 3 of the multiple of coolant circuits 1, 2, 3 in another manner by conduction, by convection, and/or by radiation for example using an arrangement or a system such as a heat exchanger, a heat pump circuit, or the like, as is further explained herein. The heat transferring system 20, as referred to herein, may also be referred to as a heat transferring arrangement.

According to the illustrated embodiments, the heat transferring system 20 comprises a valve arrangement 61, 62, 63 configured to control flow of coolant through the mixing lines 51, 52, 53. In more detail, according to the illustrated embodiments, each mixing line 51, 52, 53 comprises a valve 61, 62, 63 configured to control flow of coolant through the mixing line 51, 52, 53. In this manner, a system 10 is provided in which heat can be transferred from a colder cooling circuit 1, 2, 3 to a warmer cooling circuit 1, 2, 3 and vice versa, via the expansion tank 5. Thus, according to the embodiments illustrated in FIG. 1, the expansion tank 5 is utilized as a mixing chamber for coolant.

Moreover, as indicated above, according to the illustrated embodiments, each mixing line 51, 52, 53 is connected to the respective coolant circuit 1, 2, 3 at a location downstream of the heat exchanger 31, 32, 33 of the coolant circuit 1, 2, 3. Thereby, each mixing line 51, 52, 53 can be utilized for deairing the respective coolant circuit 1, 2, 3. Each mixing line 51, 52, 53 of the system 10 may be routed so as to facilitate the transport of air bubbles from the respective coolant circuit 1, 2, 3 to the expansion tank 5 by gravity. In more detail, each mixing line 51, 52, 53 of the system 10 may be routed such that that an extension direction of the mixing line 51, 52, 53 has a vector component parallel to a local gravity vector gv along the full length of the mixing line 51, 52, 53 when the system 10 is mounted in an intended mounting position on a vehicle and the vehicle is positioned in an upright use position. Moreover, according to some embodiments, one or more of the mixing lines 51, 52, 53 of the system 10 may be routed such that that a portion of the mixing line 51, 52, 53 has an extension direction parallel to a horizontal plane at the location of the system 10. According to such embodiments, such a mixing line 51, 52, 53 may be routed such that a vector component of the extension direction parallel to a local gravity vector gv does not change sign along the full length of the mixing line 51, 52, 53 when the system 10 is mounted in an intended mounting position on a vehicle and the vehicle is positioned in an upright use position. In this manner, air bubbles entering a mixing line 51, 52, 53 can be transported along the full length of the mixing line 51, 52, 53 in an efficient manner due to gravity and the density difference between the air bubbles and the coolant. Since each mixing line 51, 52, 53 can be utilized for deairing the respective coolant circuit 1, 2, 3, the mixing lines 51, 52, 53, as referred to herein, may also be referred to as a "deaeration line" 51, 52, 53.

According to further embodiments of the present disclosure, one or more of the coolant circuits 1, 2, 3 of the multiple of coolant circuits 1, 2, 3 may lack a mixing line 51, 52, 53 configured to transfer coolant from the coolant circuit 1, 2, 3 to another coolant circuit 1, 2, 3 of the multiple of coolant circuits 1, 2, 3. Moreover, according to some embodiments, each of the coolant circuits 1, 2, 3 of the multiple of coolant circuits 1, 2, 3 may lack a mixing line 51, 52, 53 configured to transfer coolant from the coolant circuit 1, 2, 3 to another coolant circuit 1, 2, 3 of the multiple of coolant circuits 1, 2, 3.

According to the illustrated embodiments, the system 10 comprises a first coolant circuit 1 configured to operate at a high temperature level, a second coolant circuit 2 configured to operate at an intermediate temperature level, and a third coolant circuit 3 configured to operate at a low temperature level. As an example, in order to transfer heat from the first circuit 1 to the third circuit 3, the valves 61, 63 of the first and third circuits 1, 3 can be controlled to an open state. As a result thereof, coolant from the first and third circuit 1, 3 is mixed in the expansion tank 5. Moreover, a flow of coolant is obtained from the expansion tank 5 to the first and second coolant circuit 1, 3 via the common static line portion 4 and the respective static line 41, 43 of the first and third coolant circuits 1, 3. In this manner, the first coolant circuit 1 is fed with coolant having a lower temperature than would be the case if the valves 61, 63 were in a closed state and the third coolant circuit 3 is fed with coolant having a higher temperature than would be the case if the valves 61, 63 were in a closed state. The second coolant circuit 2 is unaffected as long as the valve 62 of the mixing line 52 thereof is in a closed state. This is because there is only one fluid connection to the other coolant circuits 1, 3 via the static line 42 of the second coolant circuit 2 when the valve 62 of the mixing line 52 of the second coolant circuit 2 is in a closed state. Accordingly, the coolant circuits 1, 2, 3 of the system 10 are closed circuits in the sense that coolant is pumped through a coolant circuit 1, 2, 3 when the respective valve 61, 62, 63 is in a closed state.

The system 10 according to the present disclosure may comprise a control arrangement configured to control the opening states of the valves 61, 62, 63. Such a control arrangement is not illustrated in FIG. 1 for reasons of brevity and clarity. Moreover, such a control arrangement may be configured to control further components of the system 10, such as the coolant pumps 21, 22, 23 and the valves 71, 72, 73.

Figure 2:
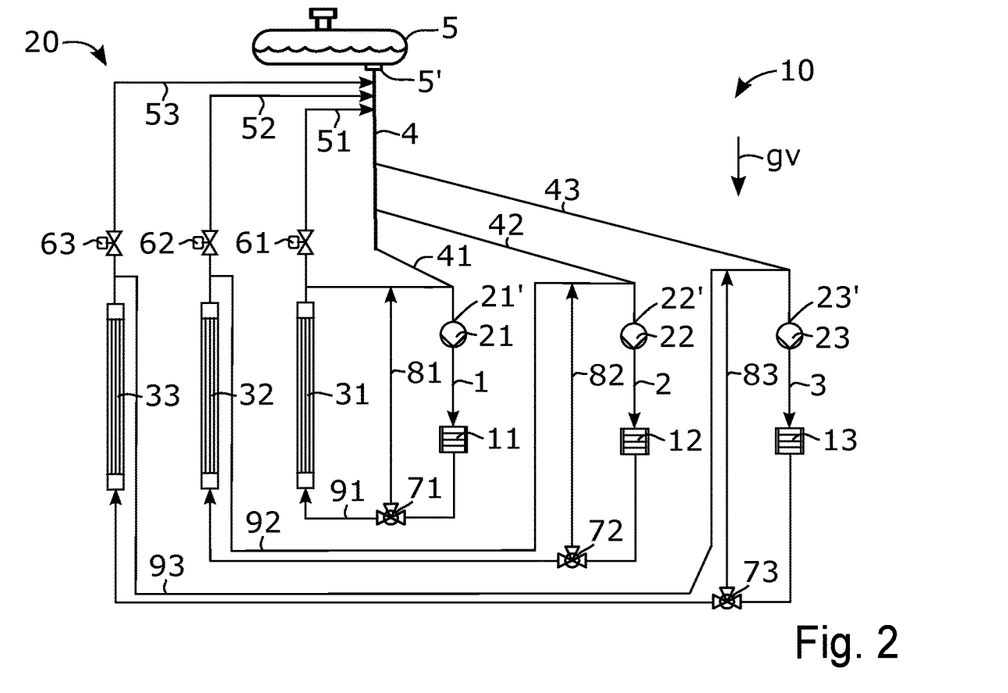
FIG. 2 illustrates a thermal management system, according to some further embodiments.

FIG. 2 illustrates a thermal management system 10, according to some further embodiments. The thermal management system 10 according to the embodiments illustrated in FIG. 2 comprises the same features, functions, and advantages, as the thermal management system 10 illustrated in FIG. 1, with some differences explained below.

According to the embodiments illustrated in FIG. 2, the mixing lines 51, 52, 53 of the system 10 are connected to the common static line portion 4. According to further embodiments, at least one of the one or more mixing lines 51, 52, 53 may be connected to the common static line portion 4. Due to these features, the common static line portion 4 is utilized as a mixing chamber for coolant. This means that, in the above given example where the valves 61, 63 of the first and third circuits 1, 3 are controlled to an open state, coolant from the first and third circuit 1, 3 is mixed in the common static line portion 4. Moreover, a flow of coolant is obtained from the common static line portion 4 to the first and second coolant circuit 1, 3 via the respective static line 41, 43 of the first and third coolant circuits 1, 3. In this manner, the first coolant circuit 1 is fed with coolant having a lower temperature than would be the case if the valves 61, 63 were in a closed state and the third coolant circuit 3 is fed with coolant having a higher temperature than would be the case if the valves 61, 63 were in a closed state. The second coolant circuit 2 is unaffected as long as the valve 62 of the mixing line 52 thereof is in a closed state. This is because there is only one fluid connection to the other coolant circuits 1, 3 via the static line 42 of the second coolant circuit 2 when the valve 62 of the mixing line 52 of the second coolant circuit 2 is in a closed state.

Figure 3:
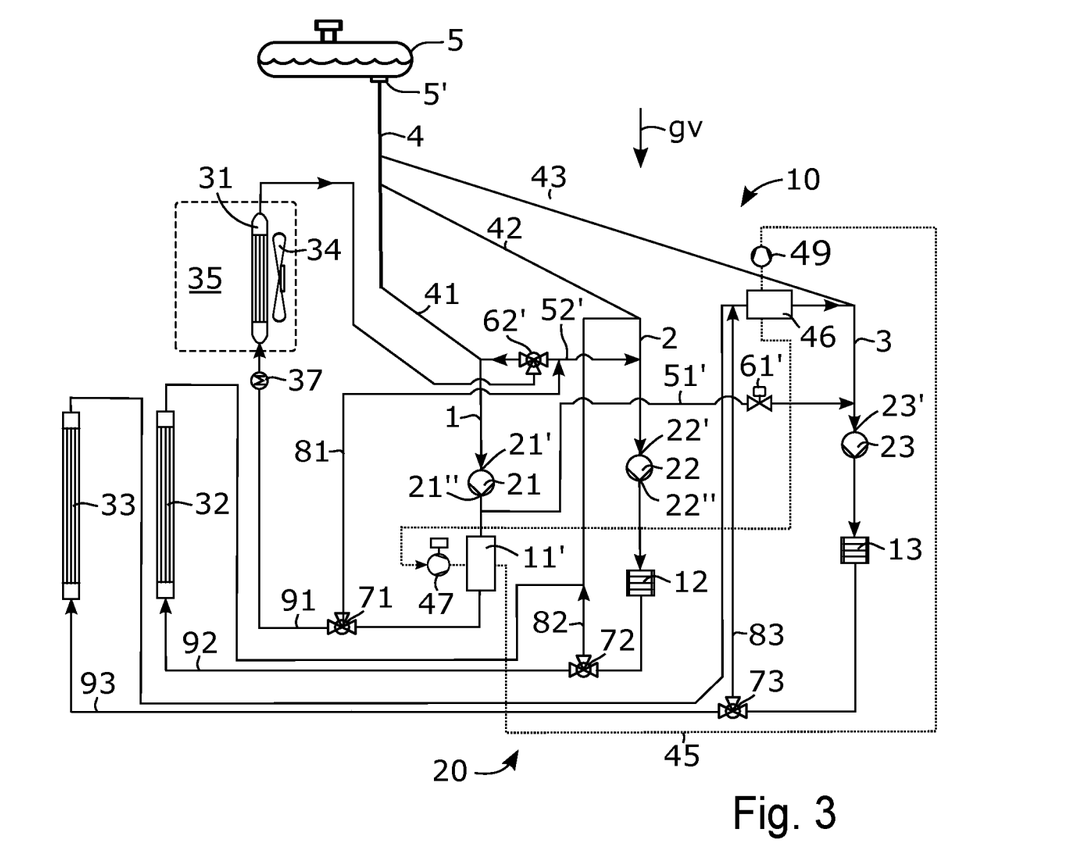
FIG. 3 illustrates a thermal management system, according to some further embodiments.

FIG. 3 illustrates a thermal management system 10, according to some further embodiments. The thermal management system 10 is configured to regulate the temperature of a number of vehicle components 11', 12, 13, as is further explained herein. The thermal management system 10 is in some places herein referred to as the "system 10" for reasons of brevity and clarity. The system 10 comprises one expansion tank 5 only and a multiple of coolant circuits 1, 2, 3. According to the embodiments illustrated in FIG. 3, the system 10 comprises three coolant circuits 1, 2, 3. According to further embodiments, the system 10 may comprise another number of coolant circuits 1, 2, 3 such as two, four, five, six, seven, or the like, as is further explained herein. Each of the multiple of coolant circuits 1, 2, 3 is configured to regulate the temperature of a vehicle component 11', 12, 13 of the number of vehicle components 11', 12, 13. Purely as an example, one or more of the components 11', 12, 13 may be a component of an internal combustion engine, an electric propulsion system, an electric propulsion motor, power electronics, a propulsion battery, a fuel cell, a retarder, a condenser of a heat pump circuit, an occupant compartment heat exchanger, or the like.

Each coolant circuit 1, 2, 3 of the multiple of coolant circuits 1, 2, 3 comprises a heat exchanger 31, 32, 33 configured to regulate the temperature of coolant in the coolant circuit 1, 2, 3. The respective heat exchanger 31, 32, 33 may be a radiator, which may be arranged at a front area of a vehicle comprising the system 10 so as to be subjected to an airflow during driving of the vehicle. Moreover, each coolant circuit 1, 2, 3 of the multiple of coolant circuits 1, 2, 3 comprises a coolant pump 21, 22, 23 comprising a pump inlet 21', 22', 23'. Each coolant pump 21, 22, 23 is configured to circulate coolant through the respective coolant circuit 1, 2, 3. Moreover, each coolant circuit 1, 2, 3 comprises a bypass line 81, 82, 83 and a valve 71, 72, 73. The bypass line 81, 82, 83 of a coolant circuit 1, 2, 3 bypasses the heat exchanger 31, 32, 33 of the coolant circuit 1, 2, 3. The respective valve 71, 72, 73 is configured to direct coolant to the bypass line 81, 82, 83 and/or to a conduit portion 91, 92, 93 connected to the heat exchanger 31, 32, 33 of the coolant circuit 1, 2, 3. Thereby, the temperature of coolant in the coolant circuits 1, 2, 3 can be regulated by regulating the valves 71, 72, 73. The valves 71, 72, 73 may be thermostatic valves configured to open and close to the bypass line 81, 82, 83 and/or to a conduit portion 91, 92, 93 based on the temperature of coolant pumped to the valve 71, 72, 73. As an alternative, or in addition, valves 71, 72, 73 may be electronically controlled valves 71, 72, 73 controlled by a control arrangement.

According to further embodiments of the herein described, the one or more of the coolant circuits 1, 2, 3 of the multiple of coolant circuits 1, 2, 3 may lack a bypass line 81, 82, 83 bypassing the heat exchanger 31, 32, 33 of the coolant circuit 1, 2, 3 and consequently also a valve 71, 72, 73 configured to direct coolant to the bypass line 81, 82, 83 and/or to a conduit portion 91, 92, 93 connected to the heat exchanger 31, 32, 33 of the coolant circuit 1, 2, 3. According to such embodiments, the temperature of coolant in the coolant circuit 1, 2, 3, and/or the cooling power of the vehicle component 11, 12, 13, may be regulated by controlling operation of the coolant pump 21, 22, 23 of the coolant circuit 1, 2, 3 and/or by controlling operation of a fan configured to generate an airflow through the heat exchanger 31, 32, 33 of the coolant circuit 1, 2, 3. According to embodiments herein, each coolant circuit 1, 2, 3 of the multiple of coolant circuits 1, 2, 3 comprises a static line 41, 42, 43 fluidly connecting the pump inlet 21', 22', 23' to the expansion tank 5.

According to the illustrated embodiments, the expansion tank 5 is mounted at a higher point than the other components of the system 10 relative to a local gravity vector gv when the system 10 is mounted to a vehicle and the vehicle is positioned in an upright use position. Each static line 41, 42, 43 fluidly connects the expansion tank 5 to a coolant circuit 1, 2, 3. Moreover, each static line 41, 42, 43 may be formed by a duct or conduit. In this manner, when the system 10 is filled with coolant, the static lines 41, 42, 43 will provide a static pressure to a respective a respective coolant circuit 1, 2, 3 of the system 10. A static line 41, 42, 43 is separated from a coolant circuit 1, 2, 3 in the sense that no coolant is pumped through the static line 41, 42, 43, during normal operation of the coolant circuit 1, 2, 3, upon operation of the coolant pump 21, 22, 23 of the coolant circuit 1, 2, 3. Accordingly, substantially no flow of fluid, or at least only a low flow rate of fluid, may be provided through the respective static line 41, 42, 43 during normal operation of the system 10.

As can be seen in FIG. 3, each static line 41, 42, 43 of the system 10 is routed so as to facilitate the transport of air bubbles from the respective coolant circuit 1, 2, 3 to the expansion tank 5 by gravity. In more detail, according to the illustrated embodiments, each static line 41, 42, 43 of the system 10 is routed such that that an extension direction of the static line 41, 42, 43 has a vector component parallel to a local gravity vector gv along the full length of the static line 41, 42, 43 when the system 10 is mounted in an intended mounting position on a vehicle and the vehicle is positioned in an upright use position. Moreover, according to some embodiments, one or more of the static lines 41, 42, 43 of the system 10 may be routed such that that a portion of the static line 41, 42, 43 has an extension direction parallel to a horizontal plane at the location of the system 10. According to such embodiments, such a static line 41, 42, 43 may be routed such that a vector component of the extension direction parallel to a local gravity vector gv does not change sign along the full length of the static line 41, 42, 43 when the system 10 is mounted in an intended mounting position on a vehicle and the vehicle is positioned in an upright use position. In this manner, air bubbles entering a static line 41, 42, 43 can be transported along the full length of the static line 41, 42, 43 in an efficient manner due to gravity and the density difference between the air bubbles and the coolant. Moreover, due to these features, filling of coolant into the system 10 may be facilitated, for example during assembly, service, and repair of the system 10. In addition, since each coolant circuit 1, 2, 3 of the multiple of coolant circuits 1, 2, 3 comprises a static line 41, 42, 43 fluidly connecting the pump inlet 21', 22', 23' to the expansion tank 5, the respective pump inlet 21', 22', 23' can be deaired in an efficient manner. Furthermore, cavitation in the respective coolant pump 21, 22, 23 can be avoided due to the fluid connection between the respective pump inlet 21', 22', 23' and the expansion tank 5.

According to the illustrated embodiments, the system 10 comprises a common static line portion 4 connected to the expansion tank 5. The static line 41, 42, 43 of each coolant circuit 1, 2, 3 fluidly connects the respective pump inlet 21', 22', 23' to the expansion tank 5 via the common static line portion 4. Thereby, a further simplified system 10 is provided in which coolant circuits 1, 2, 3 can be added to the system 10 simply by connecting a static line 41, 42, 43 of the added coolant circuit 1, 2, 3 to the common static line portion 4. The common static line portion 4 may have a greater cross sectional area than the individual static lines 41, 42, 43. According to further embodiments, the static lines 41, 42, 43 of the system 10 may be directly connected to the expansion tank 5.

According to the illustrated embodiments, each of the coolant circuits 1, 2, 3 of the multiple of coolant circuits 1, 2, 3 are configured to operate at different temperature levels. According to further embodiments, at least two coolant circuits 1, 2, 3 of the multiple of coolant circuits 1, 2, 3 may be configured to operate at different temperature levels.

According to the illustrated embodiments, the thermal management system 10 comprises a heat transferring system 20 configured to transfer heat between at least two coolant circuits 1, 2, 3 of the multiple of coolant circuits 1, 2, 3. In more detail, According to the embodiments illustrated in FIG. 3, the heat transferring system 20 comprises a heat pump circuit 45 comprising a condenser 11' arranged in one coolant circuit 1 and an evaporator 46 arranged in another coolant circuit 3 of the multiple of coolant circuits 1, 2, 3. The heat pump circuit 45 further comprises a compressor 47 configured to compress refrigerant in a direction towards the condenser 11' and an expansion valve 49 arranged upstream of the evaporator 46. In this manner, heat can be transferred from a colder coolant circuit 3 to a warmer coolant circuit 1.

According to the illustrated embodiments, one of the multiple of coolant circuits 1, 2, 3 is an occupant compartment heating circuit 1 configured to heat an occupant compartment 35 of a vehicle 30 comprising the thermal management system 10. As seen in FIG. 3, the condenser 11' is arranged in the occupant compartment heating circuit 1. Thereby, the heat collected in the evaporator 46 can be utilized to heat the occupant compartment 35 of a vehicle 30. Thus, due to these features, an energy efficient system 10 is provided. As indicated in FIG. 3, the occupant compartment heating circuit 1 comprises a heat exchanger 31 and a fan 34, wherein the fan 34 is configured to generate an airflow through the heat exchanger 31 into the occupant compartment 35. According to further embodiments, the occupant compartment heating circuit 1 may comprise another type of heat transferring device for heating the occupant compartment 35 such as one or more radiators arranged in the occupant compartment 35. Moreover, as indicated in FIG. 3, the occupant compartment heating circuit 1 may comprise an additional heater 37 upstream of the heat exchanger 31, such as an electrical heater 37. The additional heater 37 can be used if the temperature of coolant in the occupant compartment heating circuit 1 is insufficient for heating the occupant compartment 35 to a desired level. Furthermore, according to some embodiments, the additional heater 37 may be utilized to heat another coolant circuit 2, 3 of the system 1. According to such embodiments, the heat transferring system 20 may transfer heat generated by the additional heater 37 to another coolant circuit 2, 3 of the system 1.

The heat transferring system 20 of the thermal management system 10 illustrated in FIG. 3 further comprises a set of mixing lines 51', 52' for transferring coolant between at least two coolant circuits 1, 2, 3 of the multiple of coolant circuits 1, 2, 3. The mixing lines 51', 52' fluidly connects a pump outlet 21", 22" of a coolant pump 21, 22 of one coolant circuit 1, 2 to a pump inlet 21', 23' of a coolant pump 21, 23 of another coolant circuit 1, 3 of the multiple of coolant circuits 1, 3. Moreover, the heat transferring system 20 comprises a valve arrangement 61', 62' configured to control flow of coolant through the one or more mixing lines 51', 52'.

According to the illustrated embodiments, the heat transferring system 20 comprises a first mixing line 51' fluidly connecting a pump outlet 21" of a coolant pump 21 of a first coolant circuit 1 to a pump inlet 23' of a coolant pump 23 of a third coolant circuit 3. Moreover, the heat transferring system 20 comprises a valve 61' configured to regulate flow of coolant through the first mixing line 51'. In this manner, coolant can be transferred in a direct manner from the first coolant circuit 1 to the third coolant circuit 3 via the first mixing line 51' so as to transfer heat from the first coolant circuit 1 to the third coolant circuit 3. Coolant may be returned from the third coolant circuit 3 to the first coolant circuit 1 via the static line 43 of the third coolant circuit 3, the common static line portion 4, and the static line 41 of the first coolant circuit 1. Thus, in this manner, coolant can be transferred in a direct manner from the third coolant circuit 3 to the first coolant circuit 1 so as to transfer heat from the third coolant circuit 3 to the first coolant circuit 1. By controlling the opening degree of the valve 61' and the operation rate of the coolant pumps 21, 23 of the first and third coolant circuits 1, 3, the mixing rate between the first and third coolant circuits 1, 3 can be controlled in an efficient manner.

Moreover, according to the illustrated embodiments, the heat transferring system 20 comprises a second mixing line 52' fluidly connecting a pump outlet 21" of a coolant pump 21 of a first coolant circuit 1 to a pump inlet 22' of a coolant pump 22 of the second coolant circuit 2. Moreover, the heat transferring system 20 comprises a valve 62' configured to regulate flow of coolant through the second mixing line 52'. According to the illustrated embodiments, the valve 62' is configured to regulate flow of coolant through the second mixing line 52' in an indirect manner, as is explained in the following. According to the embodiments illustrated in FIG. 3, coolant may be returned from the second coolant circuit 2 to the first coolant circuit 1 via the static line 42 of the second coolant circuit 2, the common static line portion 4, and the static line 41 of the first coolant circuit 1. Due to the return of coolant from the second coolant circuit 2 to the first coolant circuit 1, coolant can be transferred in a direct manner from the second coolant circuit 2 to the first coolant circuit 1 so as to transfer heat from the second coolant circuit 2 to the first coolant circuit 1. Moreover, coolant can be transferred in a direct manner from the first coolant circuit 1 to the second coolant circuit 2 via the second mixing line 52' so as to transfer heat from the first coolant circuit 1 to the second coolant circuit 2. By controlling the opening degree of the valve 62' and the operation rate of the coolant pumps 21, 22 of the first and second coolant circuits 1, 2, the mixing rate between the first and second coolant circuits 1, 2 can be controlled in an efficient manner.

The system 10 according to the present disclosure may comprise a control arrangement configured to control the opening states of the valves 61', 62'. Such a control arrangement is not illustrated in FIG. 3 for reasons of brevity and clarity. Moreover, such a control arrangement may be configured to control further components of the system 10, such as the operation rate of one or more of the coolant pumps 21, 22, 23 of the first, second and third coolant circuits 1, 2, 3, and the valves 71, 72, 73. According to some embodiments, the control arrangement is configured to perform a conjoint control of the opening states of one or both of the valves 61', 62' and the operation rate of one or more of the coolant pumps 21, 22, 23 of the first, second and third coolant circuits 1, 2, 3 in order to control the mixing rate, i.e. the transfer of coolant, and thus also heat, between the coolant circuits 1, 2, 3.

The system 10 according to the embodiments illustrated in FIG. 3 may comprise one or more mixing lines 51, 52, 53 as described with reference to FIG. 1, and/or one or more mixing lines 51, 52, 53 as described with reference to FIG. 2. Likewise, the system 10 according to the embodiments illustrated in FIG. 1 may comprise one or more mixing lines 51', 52' as described with reference to FIG. 3, and/or one or more heat pump circuits 45 as described with reference to FIG. 3. Likewise, the system 10 according to the embodiments illustrated in FIG. 2 may comprise one or more mixing lines 51', 52' as described with reference to FIG. 3, and/or one or more heat pump circuits 45 as described with reference to FIG. 3.

Moreover, the system 10 according to the embodiments illustrated in FIG. 3 may comprise one or more deaeration lines for deairing a coolant circuit 1, 2, 3 of the multiple of coolant circuits 1, 2, 3. That is, the system 10 according to the embodiments illustrated in FIG. 3 may comprise a first deaeration line fluidly connecting the first coolant circuit 1 to the expansion tank 5. The first deaeration line may be fluidly connected to the heat exchanger 31 of the first coolant circuit 1, or to a portion located upstream or downstream of the heat exchanger 31 of the first coolant circuit 1. Furthermore, the system 10 according to the embodiments illustrated in FIG. 3 may comprise a second deaeration line fluidly connecting the second coolant circuit 2 to the expansion tank 5. The second deaeration line may be fluidly connected to the heat exchanger 32 of the second coolant circuit 2, or to a portion located upstream or downstream of the heat exchanger 32 of the second coolant circuit 2. As an alternative, or in addition, the system 10 according to the embodiments illustrated in FIG. 3 may comprise a third deaeration line fluidly connecting the third coolant circuit 3 to the expansion tank 5. The third deaeration line may be fluidly connected to the heat exchanger 33 of the third coolant circuit 3, or to a portion located upstream or downstream of the heat exchanger 33 of the third coolant circuit 3. These types of deaeration lines are not illustrated in FIG. 3 for reasons of brevity and clarity.

Since the thermal management system 10 described herein comprises a number of coolant circuits 1, 2, 3, the thermal management system 10 may also be referred to as a cooling system 10, or a coolant system 10.

Figure 4:
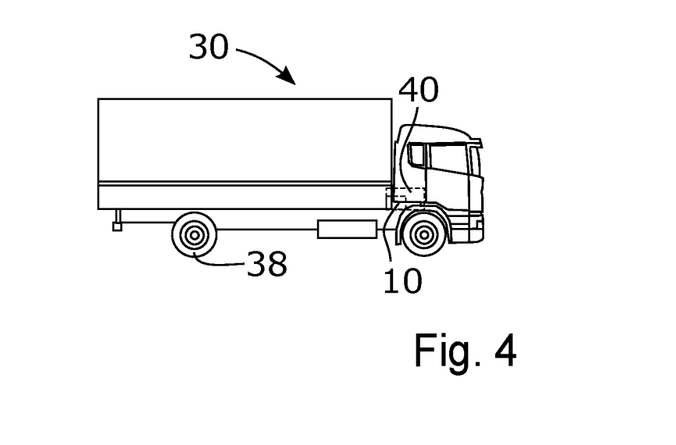
FIG. 4 illustrates a vehicle according to some embodiments.

FIG. 4 illustrates a vehicle 30 according to some embodiments. According to the illustrated embodiments, the vehicle 30 is a truck, i.e. a heavy vehicle. However, according to further embodiments, the vehicle 30 as referred to herein, may be another type of manned or unmanned vehicle for land based propulsion such as a lorry, a bus, a construction vehicle, a tractor, a car, or the like.

The vehicle 30 comprises an electric propulsion system 40 configured to provide motive power to the vehicle 30 via wheels 38 of the vehicle 30. The electric propulsion system 40 may comprise one or more electric machines, one or more propulsion batteries, power electronics and the like. Moreover, the vehicle 30 illustrated in FIG. 4 comprises a thermal management system 10. The thermal management system 10 may be a thermal management system 10 according to the embodiments illustrated in FIG. 1, a thermal management system 10 according to the embodiments illustrated in FIG. 2, or a thermal management system 10 according to the embodiments illustrated in FIG. 3. As explained with reference to these figures, the thermal management system 10 comprises a multiple of coolant circuits 1, 2, 3. According to the illustrated embodiments, the multiple of coolant circuits 1, 2, 3 is configured to regulate the temperature of a number of components of an electric propulsion system 40.

The wording upstream and downstream, as used herein, relates to the relative positions of objects in relation to an intended flow direction of fluid in the system or circuit referred to. As an example, the feature that a first object is arranged upstream of a second object in a circuit means that the first object is arranged before the second object seen relative to the intended flow direction of fluid through the circuit. As another example, the feature that a first object is arranged downstream of a second object in a circuit means that the first object is arranged after the second object seen relative to the intended flow direction of fluid through the circuit.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A thermal management system configured to regulate a temperature of a number of vehicle components, wherein the system comprises:
   an expansion tank;
   two or more coolant circuits each configured to regulate a temperature of a vehicle component of the number of vehicle components; and
   a heat transferring system configured to transfer heat between at least two coolant circuits of the two or more coolant circuits, and
   wherein each coolant circuit of the two or more coolant circuits comprises:
      a heat exchanger configured to regulate the temperature of coolant in the coolant circuit;
      a coolant pump comprising a pump inlet; and
      a static line fluidly connecting the pump inlet to the expansion tank,
   wherein the heat transferring system further comprises one or more mixing lines for transferring coolant between at least two coolant circuits of the two or more coolant circuits, and
   wherein at least one of the one or more mixing lines fluidly connects a pump outlet of a coolant pump of one coolant circuit to the static line connected to a pump inlet of a coolant pump of another coolant circuit of the two or more coolant circuits without coolant in the mixing line first passing through the expansion tank.

2. The system according to claim 1 further comprising a common static line portion connected to the expansion tank, and wherein the static line of each coolant circuit fluidly connects the respective pump inlet to the expansion tank via the common static line portion.

3. The system according to claim 1, wherein the two or more coolant circuits comprises three or more coolant circuits.

4. The system according to claim 1, wherein at least two coolant circuits of the two or more coolant circuits are configured to operate at different temperature levels.

5. The system according to claim 1, wherein the heat transferring system comprises a valve arrangement configured to control flow of coolant through the one or more mixing lines.

6. The system according to claim 1, wherein at least one of the one or more mixing lines is connected to the expansion tank.

7. The system according to claim 1, wherein the system further comprises a common static line portion connected to the expansion tank, and wherein the static line of each coolant circuit fluidly connects the respective pump inlet to the expansion tank via the common static line portion, wherein the heat transferring system comprises one or more mixing lines for transferring coolant between at least two coolant circuits of the two or more coolant circuits, wherein at least one of the one or more mixing lines is connected to the common static line portion.

8. The system according to claim 1, wherein the heat transferring system comprises a set of mixing lines comprising at least the same number of mixing lines as the number of coolant circuits of the thermal management system.

9. The system according to claim 1, wherein each coolant circuit of the two or more coolant circuits comprises a mixing line configured to transfer coolant from the coolant circuit to another coolant circuit of the two or more coolant circuits.

10. The system according to claim 1, wherein the heat transferring system comprises a heat pump circuit comprising a condenser arranged in one coolant circuit and an evaporator arranged in another coolant circuit of the two or more coolant circuits.

11. The system according to claim 1, wherein one of the two or more coolant circuits is an occupant compartment heating circuit configured to heat an occupant compartment of a vehicle comprising the thermal management system.

12. The system according to claim 11, wherein the heat transferring system comprises a heat pump circuit comprising a condenser arranged in one coolant circuit and an evaporator arranged in another coolant circuit of the two or more coolant circuits, wherein the condenser is arranged in the occupant compartment heating circuit.

13. The system according to claim 1, wherein at least one of the two or more coolant circuits is configured to regulate the temperature of a component of an electric propulsion system.

14. A vehicle comprising a thermal management system configured to regulate a temperature of a number of vehicle components, wherein the system comprises:
   an expansion tank;
   two or more coolant circuits each configured to regulate a temperature of a vehicle component of the number of vehicle components; and
   a heat transferring system configured to transfer heat between at least two coolant circuits of the two or more coolant circuits,
   wherein each coolant circuit of the two or more coolant circuits comprises:
      a heat exchanger configured to regulate the temperature of coolant in the coolant circuit;
      a coolant pump comprising a pump inlet; and
      a static line fluidly connecting the pump inlet to the expansion tank,
   wherein the heat transferring system further comprises one or more mixing lines for transferring coolant between at least two coolant circuits of the two or more coolant circuits, and
   wherein at least one of the one or more mixing lines fluidly connects a pump outlet of a coolant pump of one coolant circuit to the static line connected to a pump inlet of a coolant pump of another coolant circuit of the two or more coolant circuits without coolant in the mixing line first passing through the expansion tank.

15. The system according to claim 14 further comprising a common static line portion connected to the expansion tank, and wherein the static line of each coolant circuit fluidly connects the respective pump inlet to the expansion tank via the common static line portion.

16. The system according to claim 14, wherein the two or more coolant circuits comprises three or more coolant circuits.

17. The system according to claim 14, wherein at least two coolant circuits of the two or more coolant circuits are configured to operate at different temperature levels.

18. The system according to claim 14, wherein the heat transferring system comprises one or more mixing lines for transferring coolant between at least two coolant circuits of the two or more coolant circuits.

19. A thermal management system configured to regulate a temperature of a number of vehicle components, wherein the system comprises:
an expansion tank;
two or more coolant circuits each configured to regulate a temperature of a vehicle component of the number of vehicle components; and
a heat transferring system configured to transfer heat between at least two coolant circuits of the two or more coolant circuits,
wherein each coolant circuit of the two or more coolant circuits comprises:
a heat exchanger configured to regulate the temperature of coolant in the coolant circuit;
a coolant pump comprising a pump inlet; and a static line fluidly connecting the pump inlet to the expansion tank; and
a common static line portion connected to the expansion tank, and wherein the static line of each coolant circuit fluidly connects the respective pump inlet to the expansion tank via the common static line portion,
wherein the heat transferring system comprises one or more mixing lines for transferring coolant between at least two coolant circuits of the two or more coolant circuits, and
wherein at least one of the one or more mixing lines is directly connected to the common static line portion such that the coolant output from the at least one of the one or more mixing lines is provided to the common static line.

20. A thermal management system configured to regulate a temperature of a number of vehicle components, wherein the system comprises: an expansion tank; two or more coolant circuits each configured to regulate a temperature of a vehicle component of the number of vehicle components; and a heat transferring system configured to transfer heat between at least two coolant circuits of the two or more coolant circuits, wherein each coolant circuit of the two or more coolant circuits comprises: a heat exchanger configured to regulate the temperature of coolant in the coolant circuit; a coolant pump comprising a pump inlet; and a static line fluidly connecting the pump inlet to the expansion tank; a common static line having a first portion connected to the expansion tank and a second portion extending from the first portion, and wherein the static line of each coolant circuit fluidly connects the respective pump inlet to the expansion tank via connection to the second portion of the common static line, wherein the heat transferring system comprises one or more mixing lines for transferring coolant between at least two coolant circuits of the two or more coolant circuits, and wherein at least one of the one or more mixing lines is connected to the second portion of the common static line such that the coolant output from the at least one of the one or more mixing lines is provided to the common static line; and wherein at least one of the one or more mixing lines is connected to the second portion of the common static line at a position between the connection of the first portion of the common static line to the expansion tank and connection of one of the static lines of one of the coolant circuits to the second portion of the common static line.

* * * * *